Aug. 12, 1930.   L. RIXECKER   1,772,817
BEARING FOR ROLLS IN ROLLING MILLS
Filed Aug. 23, 1928

Inventor
Ludwig Rixecker,

Patented Aug. 12, 1930

1,772,817

UNITED STATES PATENT OFFICE

LUDWIG RIXECKER, OF STANGENMUHLE, NEAR LOUISENTHAL, GERMANY, ASSIGNOR TO RÖCHLING'SCHE EISEN- UND STAHLWERKE AKTIENGESELLSCHAFT, OF VOLKLINGEN-ON-THE-SAAR, GERMANY, A CORPORATION

BEARING FOR ROLLS IN ROLLING MILLS

Application filed August 23, 1928, Serial No. 301,569, and in Germany September 6, 1927.

It is still usual to employ metal bearings which are lubricated by the introduction of lard and lubricating insertions or briquettes for the cogging and breaking down or coarse trains of rolls in rolling mills. In certain individual cases forced lubrication has already been adopted and in these cases the fat is supplied to the journal through special lubricating grooves in the bearing. After a short time the lubricating grooves in the bearing become ineffective by reason of the wear and also of the presence of foreign bodies, whereupon the lubrication fails leading in turn to too rapid wear and consumption of power. Re-cutting of the lubricating grooves interferes with the operation of the mill and causes loss on account of the unnecessarily early disassembly and remounting of the rolls and may result in a considerable falling off in the production.

Brass bearings for rolls are also known wherein hard wood sections are incorporated to reduce the weight. In such cases the lubrication is effected by the use of lard and lubricating insertions or briquettes. This type of bearing also lasts a short time only on account of the bad lubrication and the entry of foreign bodies into the bearing. It also frequently happens that the sections of wood incorporated catch fire. Bearings wholly of wood are not feasible in many cases on account of the size of the bearing since the hard wood which might be suitable for the purpose has not the dimensions to allow of the bearing being cut out therefrom and furthermore the wood alone cannot take up the high rolling pressure.

The present invention relates to a roll bearing which eliminates the above defects and consists in a thin walled metal shell or jacket having ribs forming partitions between chambers, open towards the roll, in which hard wood, greases and packing materials are accommodated separately. The grease chambers extend considerably beyond the depth of wear of the bearing so that even with the greatest wear of said bearing a large store of grease still remains in the chambers and the grease chambers may at the same time be connected to a mechanical pressure lubricating arrangement. Foreign bodies introduced, with impure grease or the like, into the grease chambers can deposit therein without harming the bearing on account of the spacious extent of said chambers.

The packing chambers serve to protect the bearing against the entry of roller scale or the like and are preferably provided with felt insertions which at the same time absorb any excess amount of grease and thereby bring the same to act again upon the journals. The chambers for large insertions of hard wood sections, introduced from the roll side of the bearing, constitute with said wood the bearing proper. The sections inserted must be fitted tightly. The hard wood employed in these chambers may be replaced by any other material which will offer sufficient resistance to the rolling pressure and is suitable for bearings. The ribs exposed to wear may be repaired readily and rapidly by welding-up so that the metal bearing proper which preferably consists of delta metal lasts for an unlimited time. The hard wood or other insertions must be renewed when they have become worn. The arrangement of the chambers is preferably such that the packing chambers are located on the entry and exit sides (in relation to the direction of rotation of the journal) and also that one grease chamber on the entry side is provided in rolling mills with a single direction of rotation and two grease chambers in reversing rolling mills. The insertion chambers fill the remaining space.

In roll bearings with a single direction of rotation the bearing is preferably made higher on the entry side in order that the lateral thrust caused during rolling shall experience greater resistance and thus the length of life of the bearing extended. The ribs of the grease chambers are stiffened by small connecting or spacing pieces and these connecting or spacing pieces are offset to one another in a bearing having several grease chambers.

Referring to the drawings—

Fig. 1 illustrates one embodiment of the invention wherein the housing $a$ comprises a grease chamber $c$, two packing chambers $d$ and four chambers $b$ for hard wood or other insertions.

Fig. 2 is a section on the line 2—2 through the grease chambers of Fig. 1, $e$ being connecting pieces between two ribs, on the housing, forming said grease chambers.

Fig. 3 illustrates a modification wherein a grease chamber $h$ on the entry side (cf. direction rotation indicated by arrow) of the bearing $f$ is provided with a preceding packing chamber $i$; $g$ are the chambers for insertions.

Fig. 4 is a lateral elevation of the modification shown in Fig. 3.

Fig. 5 illustrates a bearing for reversible rolling mills wherein two grease chambers $m$ are arranged symmetrically; $k$ indicates the housing, $l$ the chambers for the insertions and $n$ the packing chambers.

Figure 1:
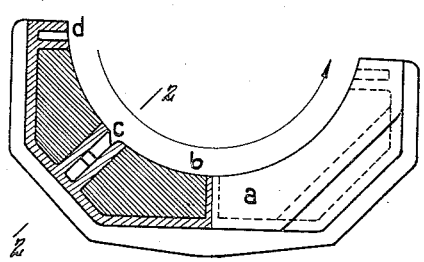
Figure 1 is an end view partly in section of one form embodying my invention.
Figure 2:
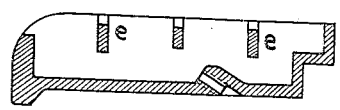
Fig. 2 is a section thereof on line 2—2 of Fig. 1.
Figure 3:
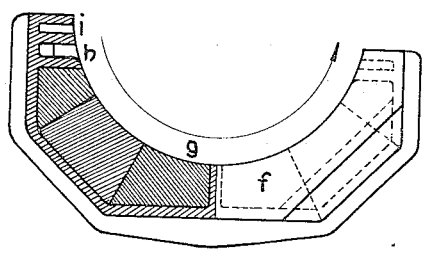
Fig. 3 is a view similar to Fig. 1 of a modification.
Figure 4:
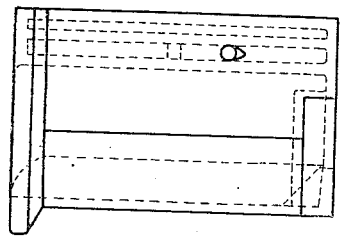
Fig. 4 is a side elevation of Fig. 3.
Figure 5:
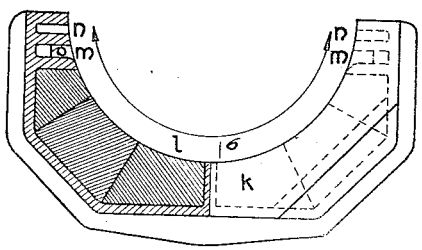
Fig. 5 is a view similar to Fig. 1, of a bearing for reversible rolls.
Figure 6:
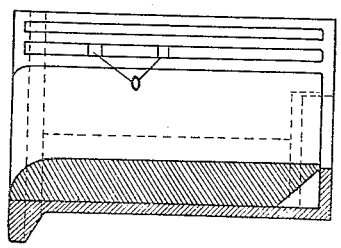
Fig. 6 is a section on line 6—6 Fig. 5.

Fig. 6 is a section on the line 6—6 through the bearing illustrated in Fig. 5. The offset arrangement of the connecting pieces $o$ in the grease chambers is shown. That is, the pieces $o$ on one side of the bearing are to the left and those on the other side to the right hand, so as to be out of alinement, or vice versa, to prevent an unlubricated zone, in case of excessive wear.

The consumption of brass in heavy rolling trains is almost wholly eliminated by the bearing according to this invention and thus high expenses for bearing metals are avoided. Furthermore successful use may be made of hard wood bearings which was hitherto only possible with light rolling trains.

Naturally the roll bearing of the invention may be employed in any rolling trains journals of which can be cooled. The chambers employed to accommodate grease or packing materials may also be obviated.

What I claim is:

1. A bearing for the rolls of roller mills, consisting of a thin walled metal shell having longitudinal ribs forming chambers open at one end and into which bearing material can be driven through said open end, a rib at each side of the bearing spaced from and forming with the aforesaid ribs a grease chamber, and pieces in the grease chamber connecting the spaced ribs that are in different transverse planes.

2. A bearing for the rolls of roller mills, comprising a thin-walled metal shell having parallel longitudinal grooves open at one end, bearing blocks driven through said open end into grooves, and narrower lubricating grooves closed at both ends, parallel with and adjacent the aforesaid grooves, and a packing chamber adjacent one of the lubricating grooves.

3. A bearing for the rolls of roller mills, comprising a thin-walled metal shell having parallel longitudinal grooves open at one end, bearing blocks driven into said grooves through said open ends, lubricating grooves adjacent the grooves for the bearing blocks, and a packing chamber at the entering side of the bearing, said entry side being higher than the exit side.

In testimony that I claim the foregoing as my invention, I have signed my name this 9th day of August, 1928.

LUDWIG RIXECKER.